United States Patent [19]

Baldarelli et al.

[11] Patent Number: 4,578,015

[45] Date of Patent: Mar. 25, 1986

[54] TRUCK BODY WITH PULL-OFF DOOR

[75] Inventors: Wallace E. Baldarelli, West Boylston; Wilfred J. Grenier, Rutland, both of Mass.

[73] Assignee: Baldarelli Bros., Inc., West Boylston, Mass.

[21] Appl. No.: 505,055

[22] Filed: Jun. 16, 1983

[51] Int. Cl.[4] .............................................. B60P 1/00
[52] U.S. Cl. .................................. 414/513; 198/735; 414/516
[58] Field of Search ............... 414/304, 325, 509, 513, 414/514, 515, 516, 519; 198/735, 748; 100/250

[56] References Cited

U.S. PATENT DOCUMENTS

| | | | |
|---|---|---|---|
| 2,218,121 | 10/1940 | Paiement | 414/509 X |
| 2,298,982 | 10/1942 | Smith | 414/515 X |
| 2,541,538 | 2/1951 | Newell | 414/514 X |
| 3,273,728 | 9/1966 | Kelso | 414/513 |
| 3,921,832 | 11/1975 | Smith | 414/509 |
| 3,953,170 | 4/1976 | Webb | 414/517 |
| 4,014,428 | 3/1977 | Ossbahr | 198/345 |
| 4,162,735 | 7/1979 | Lewis | 414/514 |

OTHER PUBLICATIONS

East Manufacturing Corp. brochure, "Fast Pusher", Jun. 25, 1985.

Primary Examiner—Robert J. Spar
Assistant Examiner—Ken Muncy
Attorney, Agent, or Firm—Lewis M. Smith, Jr.

[57] ABSTRACT

A load carrying body for a truck or truck trailer, including a flat rigid bottom panel assembly and two flat rigid side panel assemblies respectively secured along their bottom edges to the respective side edges of the bottom panel assembly, all enclosed across their rear ends by a selectively latched or unlatched pivotally supported load retaining door assembly.

A load manipulating door assembly, initially positioned to enclose the front end of the load carrying body, having a bottom and two side edge portions all supporting uninterrupted elongate flexible wiper strips respectively continuously maintained in uninterrupted sliding engagement with the inner surfaces of the load carrying body.

Multiple synchronously operated door driving mechanisms with a plurality of them mounted upon each side panel, each connected to, supporting and moving the attached load manipulating door assembly lengthwise of the body, either to discharge a load from the body with the load retaining door assembly unlatched, or to compact a load within the body with the load retaining door assembly latched.

Pairs of relatively wide recessed channels extending lengthwise of each side panel assembly, each straddling a relatively narrow slot lengthwise of each side panel assembly and accommodating passage therealong of door supporting arms interconnecting the load manipulating door assembly and each door driving mechanism, and pairs of flexible sealing strips yieldably secured within the pairs of channels and flush with the inner surface of each side panel assembly to maintain uninterrupted sealing engagement with the coacting wiper strip.

Multiple pairs of opposed elongated straight rigid track members engaging opposite sides of one of multiple slide assemblies each connected to a door driving mechanism and attached to a door supporting arm outwardly of and therefor protected by the cooperating sealed relatively narrow slot for movement freely lengthwise of the load carrying body but not otherwise either vertically horizontally.

1 Claim, 11 Drawing Figures

TRUCK BODY WITH PULL-OFF DOOR

BACKGROUND OF THE INVENTION

Load carrying bodies were an integral part of trucks from their earliest beginnings, prominently including the open top box type especially useful for carrying particulate material such as dirt, sand, gravel, and many other heavy semi-fluid materials. Shortly thereafter the box type body was equipped with a pivotally attached tail gate selectively locked to retain a load or released to discharge a load, and the box type body was pivotally mounted at the rear end of a truck and provided at its front end with lifting means to raise and tilt the box type body, thereby creating the universally used dump truck.

This arrangement for discharging a load quickly and easily naturally worked best when the bottom and sides of the truck body had smooth uninterrupted inside surfaces without projecting obstructions, as was generally the case.

However trucks got larger, loads got much larger and much heavier and had to be lifted higher to be unloaded, often on soft or sloping surfaces or under overhead obstructions where their use was difficult or downright dangerous.

As long as fifty years ago efforts were made to improve on the truck body configuration and mode of operation summarized above, as in U.S. Pat. No. 1,927,653 issued Sept. 19, 1933 to W. G. Wehr, and more recently in U.S. Pat. No. 3,953,170 issued Apr. 27, 1976 to James O. Webb, each disclosing a truck body fixedly mounted horizontally on a truck or truck trailer, provided with a load pusher or ejector initially located toward the front of the truck body when it is loaded, and later moved lengthwise of the truck body to discharge the load from its rear end.

Large trailer truck bodies incorporating various features generally corresponding to those described and illustrated in U.S. Pat. No. 3,953,170 are presently in use commercially.

SUMMARY OF THE INVENTION

As noted above, the fixedly mounted horizontally disposed truck bodies provided with internally mounted power actuated load discharging rams have been evolving over many years past, but with the addition to the inner surfaces of the bottom or sides of the truck bodies of access openings and even elongated slots provided to accommodate the passage of various mechanical parts, possibly also internally located chains, track and guides, and even large ram driving mechanisms mounted inside the truck body and occupying considerable space which would otherwise be available as part of the useful volume of the load carrying compartment provided by the truck body.

The present invention contemplates a truck or truck trailer body fixedly horizontally mounted and having smooth effectively uninterrupted interior bottom and side surfaces of constant cross section over the entire length of its maximized load containing compartment, arrranged to receive and cooperate with an internally fully floating load displacement pull-off door initially located in a minimum space at the front end of the truck body and constantly maintained in sealable engagement with the bottom and side interior surfaces of the truck body, as it is moved rearwardly of the truck body.

The present invention further contemplates a load displacement pull-off door precisely positioned and maintained supported on multiple thin-sectioned supporting arms arranged to pass beneath lengthwise elongated sealing strips respectively mounted and secured within cooperating relatively wide elongated channels of the same cross section as the respective coacting sealing strips to maintain the smooth uninterrupted inner surfaces of the sides of the load containing compartment and through relatively narrow elongated slots therebehind in the sides of the truck body for operative engagement with externally located multiple synchronously driven chain drive mechanisms and cooperating externally located multiple door supporting and constraining means, all preferably disposed neatly within the structural thickness of the respective sides of the truck body.

The preferred embodiment of the instant invention is illustrated in the accompanying drawings and described in the following text, noting the various features shown in these drawings are entirely in conformance with the various general features and the several design details incorporated in the engineering drawings from which the inventors have constructed a full scale and fully functional prototype load carrying and discharging body, mounted upon a suitable truck, for entirely realistic test operations, both under normal operating conditions and under extremely adverse operating conditions.

BRIEF DESCRIPTION OF THE DRAWINGS

Referring now to the several drawing herewith, wherein like reference numerals refer to like or corresponding parts.

DETAILED DESCRIPTION OF THE PREFERRED EMBODIMENT OF THE INVENTION

Figure 1:
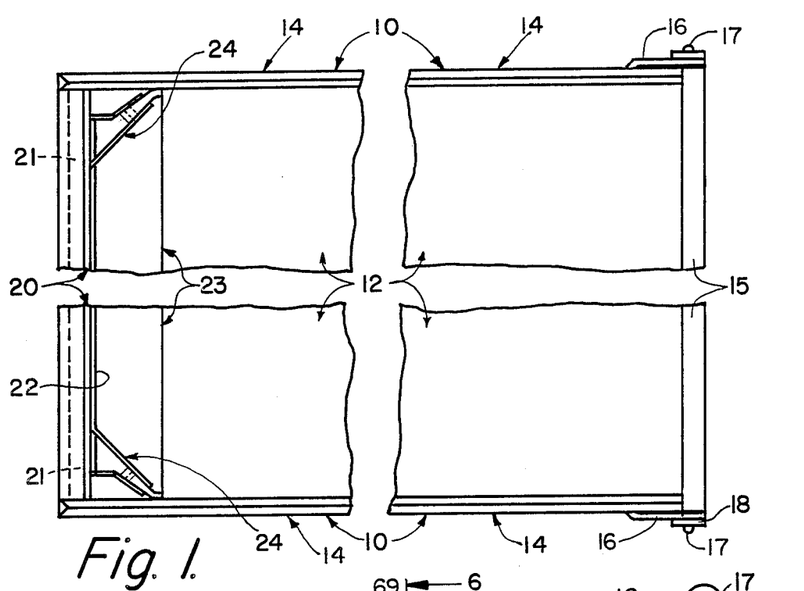
FIG. 1 is a simplified schematic top plan view, partially broken away, of a typical truck or truck trailer body showing thereon components of the inventive device disclosed herein in operative relation thereto.

Referring first to the showing in FIG. 1, a truck or truck trailer body generally designated by the reference numeral 10 includes a bottom panel assembly generally designated by the reference numeral 12 interconnected along its opposite sides with the bottom edges of first and second side panel assemblies each generally designated by reference numeral 14 and each supporting adjacent its upper rear corner a bracket 18 arranged to support rotatably therein one of a pair of pivot pins 17 projecting therefrom and rotatably engaged by one of a pair of elongated hangers 18 attached to one of the opposite upper ends of a load retaining or releasing rear door or gate assembly 15, depending on whether it is fixedly secured against the rear edges of the bottom panel assembly 12 and the side panel assemblies 14 or released to pivot freely about pins 17 rotatably engaged by brackets 18.

FIG. 1 also shows a top view of the load displacing pull-off door assembly generally designated by reference numeral 20, shown in its initial stored position immediately adjacent to the front edges of the bottom panel assembly 12 and the side panel assemblies 14, supported by upper and lower transversely extending elongated door frame members 21 incorporated therein and including a rearwardly facing working surface consisting of a planar upper center portion 22 surrounded by a downwardly and rearwardly sloped bottom marginal section 23 and by outwardly and rearwardly sloped side marginal sections 24, all fitted along their outer edges with elongated flexible wiper strips described in greater detail further below.

Figure 2:
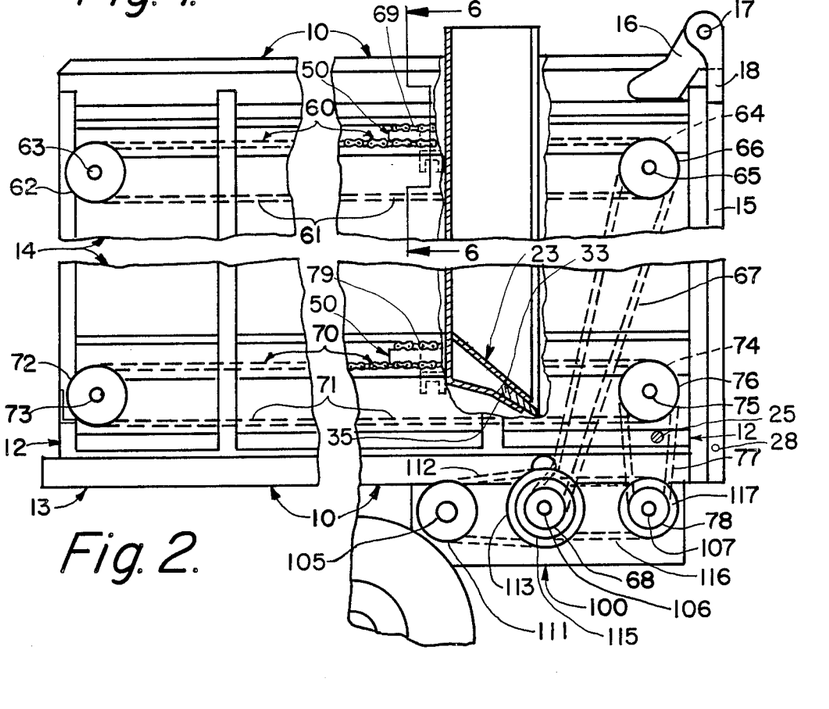
FIG. 2 is a simplified schematic side elevation, partially broken away and partially sectioned on line 2—2 of FIG. 3 and on line 2—2 of FIG. 4, of the same truck or truck trailer body also showing components of the inventive device disclosed herein in operative relation thereto.

Referring next to the showing in FIG. 2, this view of the truck or truck trailer body generally designated by reference numeral 10 also shows the bottom panel assembly generally designated by the reference numeral 12 interconnected along its sides, as by welding, with the bottom edges of first and second side panel assemblies each generally designated by reference numeral 14 respectively supporting first and second upstanding brackets 16 fixedly supporting first and second pivot pins 17, projecting into relatively rotatable engagement with, elongated hangers 18 attached to the opposite upper sides of rear door or gate 15, and additionally shows a schematic representation of a suitable body supporting frame assembly generally designated by reference numeral 13 upon which the body 10 is fixedly mounted horizontally disposed as shown, and to the rearward underside of which is attached to main drive mechanism for the pull-off door assembly 20, said main drive mechanism being generally designated by the reference numeral 100.

Figure 4:
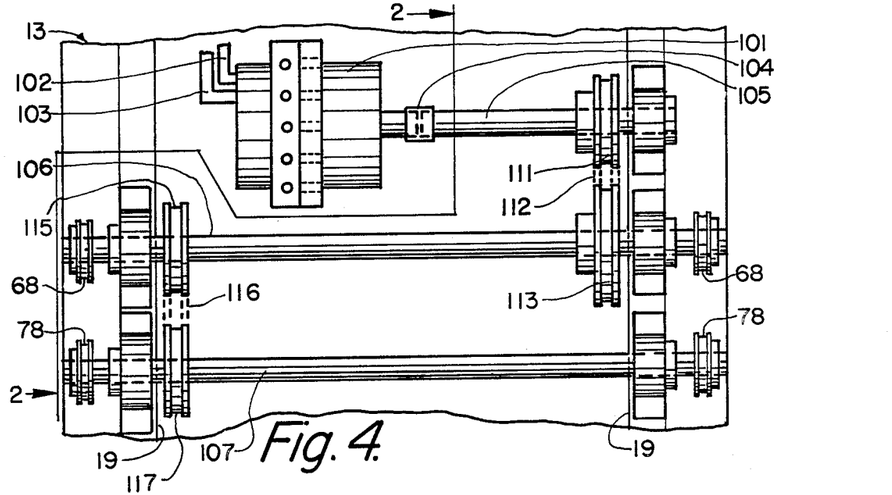
FIG. 4 is a bottom plan view of an hydraulically driven power train suitable for use as the main drive mechanism for operating the inventive device disclosed herein.

In FIG 2, the showing of main drive mechanism 100, taken on line 2—2 of FIG. 4, includes representations of motor driven shaft 105, driving sprocket 111, drive chain 112, driven sprocket 113, power shaft 106, driving sprocket 115, drive chain 116, driven sprocket 117, and power shaft 107, and includes an upper power drive sprocket 68 mounted upon the end of power shaft 106 and engaged by upper power drive chain 67, and a lower power drive sprocket 78 mounted upon the end of power shaft 107 and engaged by lower power drive chain 77.

FIG. 2 also shows one of two upper pull-off door displacing chain drive mechanisms generally designated by reference numeral 60 and including representations of roller drive chain 61, front drive chain sprocket 62, front sprocket mounting shaft 63, and power driven sprocket 66 mounted on rear sprocket mounting shaft 65 and engaged by power drive chain 67, first referred to above, and one of two lower pull-off door displacing chain drive mechanisms generally designated by reference numeral 70 and including representations of roller drive chain 71, front drive chain sprocket 72, front sprocket mounting shaft 73, and power driven sprocket 76 mounted on rear sprocket mounting shaft 75 and engaged by power drive chain 77, first referred to above.

Figure 3:
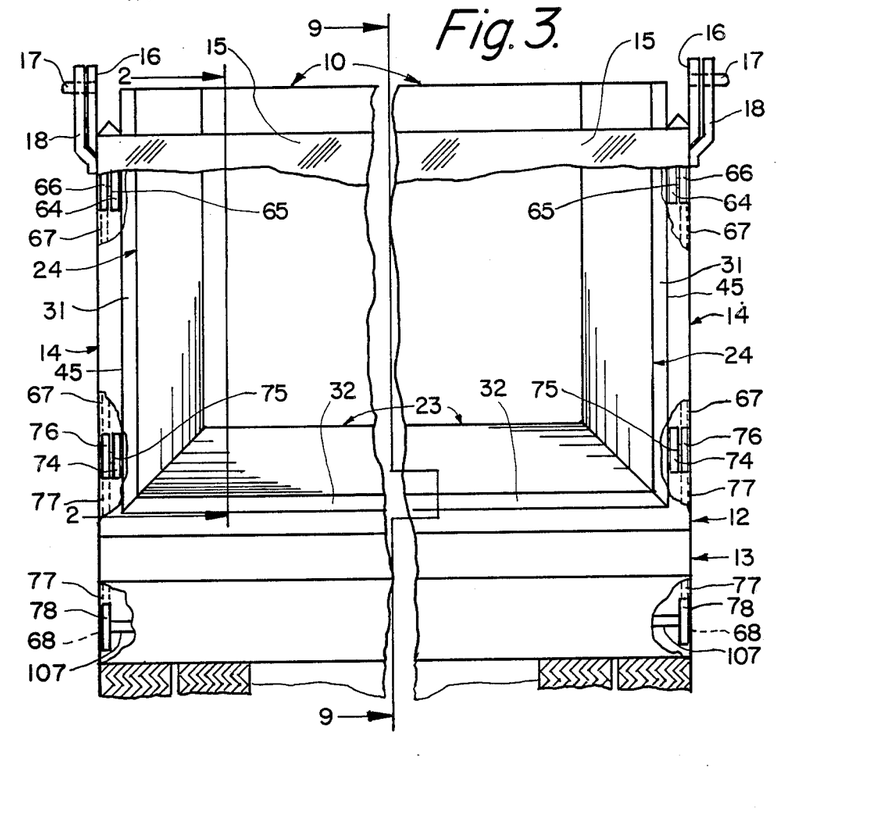
FIG. 3 is a simplified schematic rear elevation, partially broken away, of the same truck or truck trailer body also showing components of the inventive device disclosed herein in operative relation thereto.

Referring now to the showing in FIG. 3, this view of the truck or truck trailer body 10 best shows the various components of the rearwardly facing working surface of the pull-off door assembly 20 including the planar upper center portion 22, the downwardly and rearwardly sloped bottom marginal section 23, the outwardly and rearwardly sloped side marginal sections 24, and the elongated flexible wiper strips 31, 32 and 31 along their respective three edges. In order to enhance the showing described above, rear door assembly 15, attached to elongated hangers 18 rotatably engaging pivot pins 17 fixedly supported by brackets 16 is shown broken away.

FIG. 3 also shows components of the upper pull-off door displacing chain drive mechanism 60 mounted upon each side panel assembly 14 of typical welded box frame construction, and, in fact, disposed between the planar inner surface 45 and the outermost extremities of each side panel assembly 14, and components of the lower pull-off door displacing chain drive mechanism 70 similarly mounted upon and within the thickness of each side panel assembly 14. In FIG. 3, the visible components of the upper chain drive mechanism 60 include rear drive chain sprockets 64 and power driven sprockets 66 both fixedly mounted on one of the rear sprocket mounting shafts 65, with power driven sprockets 66 connected to power drive sprockets 68 by power drive chains 67, and the visible components of the lower chain drive mechanism 70 include rear drive chain sprockets 74 and power driven sprockets 76 both fixedly mounted on one of the rear sprocket mounting shafts 75, with power driven sprockets 76 connected to power drive sprockets 78 by power drive chains 77. For a more comprehensive description of the main drive mechanism 100, see the following description of FIG. 4, and for a more comprehensive description of the four chain drive mechanisms 60, 60, 70 and 70, see the next following description of FIG. 5.

Considering here the showing in FIG. 4, the pull-off door main drive mechanism 100 may be securely attached to the rearward underside of the body supporting frame assembly 13, and more particularly, for example, to longitudinally extending body supporting frame members 19 incorporated therein, as shown in FIG. 4.

FIG. 4 also shows rotary hydraulic motor 101 provided with hydraulic lines 102 and 103 for circulating pressurized hydraulic fluid provided by the truck power take-off or other suitable source. The hydraulic motor 101 is connected by coupling 104 to motor driven shaft 105 supporting a driving sprocket 111 connected by roller driven chain 112 to driven sprocket 113 mounted upon power shaft 106, also supporting adjacent to its opposite ends first and second power drive sprockets 68, both connected to the upper chain drive mechanisms 60, as described above and below. Power shaft 106 also has mounted upon it a driving sprocket 115 connected by roller drive chain 116 to driven sprocket 117 mounted upon power shaft 107, also supporting adjacent to its opposite ends first and second power drive sprockets 78, both connected to the lower chain drive mechanisms 70, as described above and below.

Figure 5:
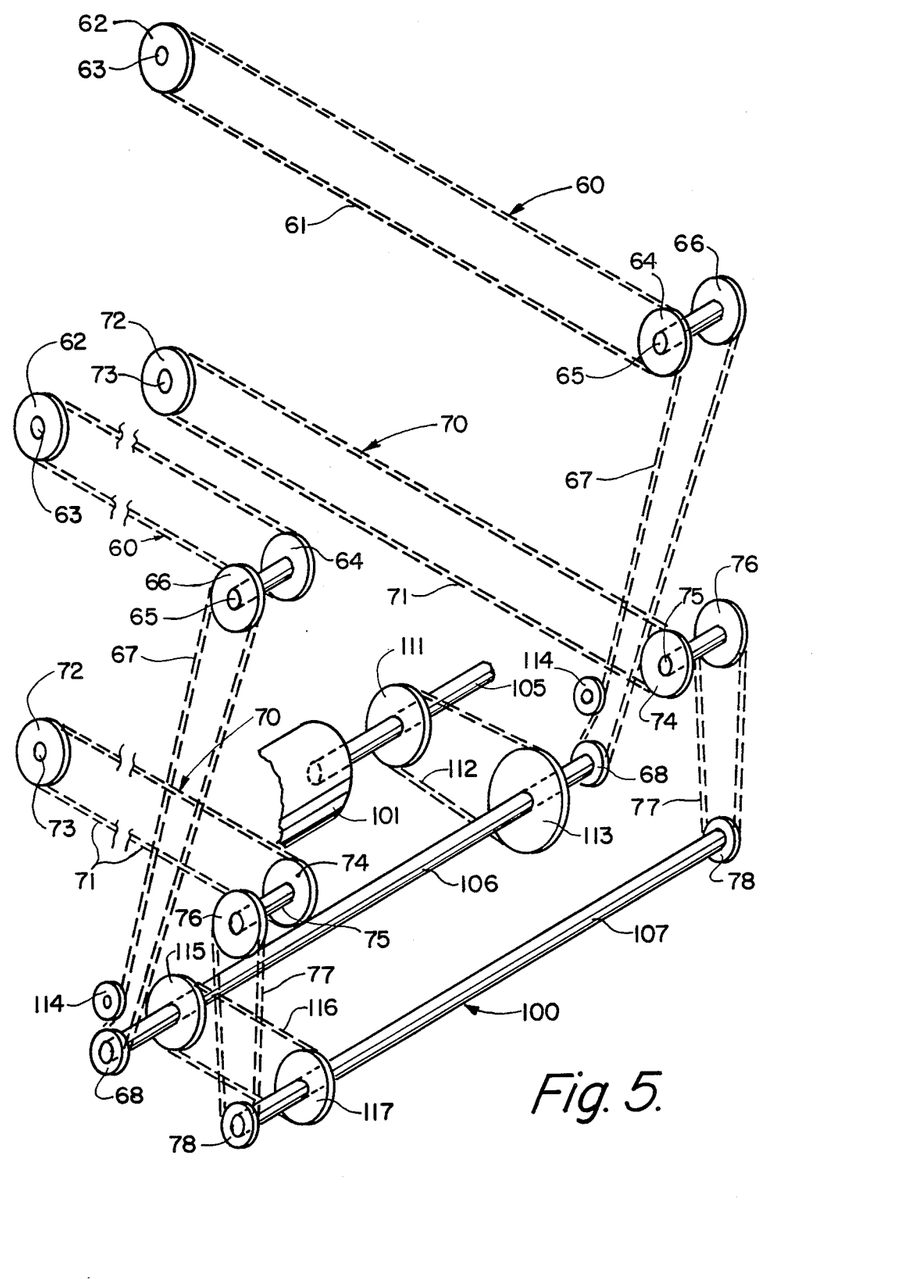
FIG. 5 is an isometric schematic representation of the spatial and operative relationship between the two upper and the two lower synchronously drive chain drive mechanisms of the inventive device disclosed herein, and their connections to the single main drive mechanism shown in FIG. 4.

Turning next to the showing in FIG. 5, this isometric view shows most clearly the spatial and operative relationship between all of the components of the entire pull-off door driving mechanism of the inventive device described herein.

The showing in FIG. 5 includes views of first and second upper chain drive mechanisms, with one shown foreshortened, each generally designated by reference numeral 60 and incorporating a roller drive chain 61 interconnecting a front drive chain sprocket 62 rotatably mounted upon a front sprocket mounting shaft 63 and a rear drive chain sprocket 64 fixedly secured to and rotatable with a rear sprocket mounting shaft 65 also fixedly secured to and rotatable with a power driven sprocket 66, which by means of one of the upper power drive chains 67 is connected to a power drive sprocket 68 of the main drive mechanism 100 also shown isometrically in FIG. 5 and fully described above, as shown in FIG. 4.

The take-up pulleys 114 shown schematically in FIG. 5 in operative engagement with the respective upper power drive chains 67 are adjustably pivotally mounted upon the respective side panel assemblies 14 for use in adjusting the tension in the respective upper power drive chains 67 in the manner well-known in the art.

The showing in FIG. 5 also includes views of first and second lower chain drive mechanisms, with one shown foreshortened, each generally designated by reference numeral 70 and incorporating a roller drive chain 71 interconnecting a front drive chain sprocket 72 rotatably mounted upon a front sprocket mounting shaft 73 and a rear drive chain sprocket 74 fixedly secured to and rotatable with a rear sprocket mounting shaft 75 also fixedly secured to and rotatable with a power driven sprocket 76, which by means of one of the lower power drive chains 77 is connected to a power drive sprocket 78 of the main drive mechanism 100 also shown isometrically in FIG. 5 and fully described above, as shown in FIG. 4.

Figures 6, 7:
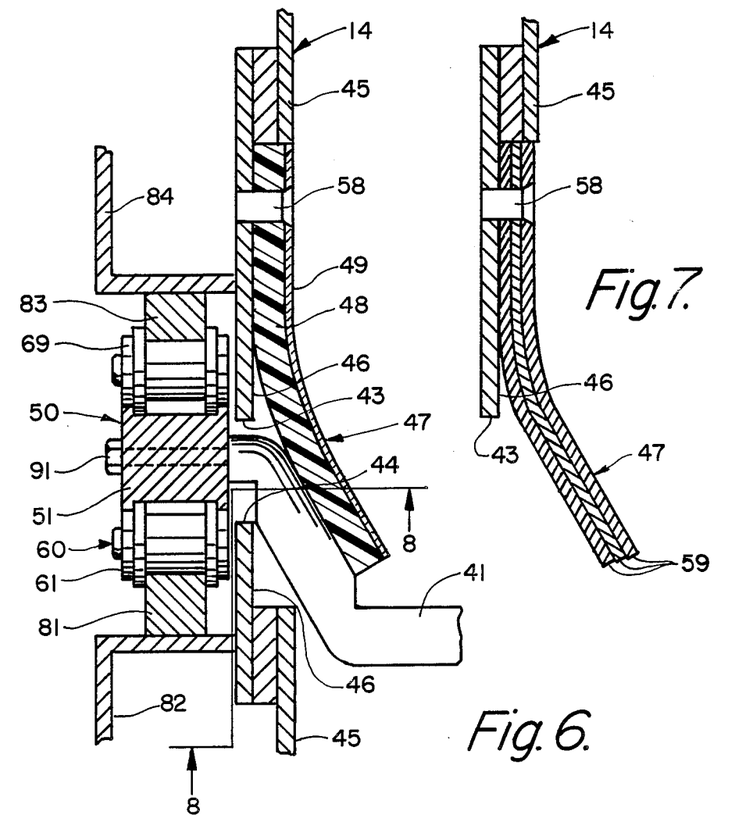
FIG. 6 is a transverse vertical section taken on line 6—6 of FIG. 2, partially broken away, showing novel components of the prefered embodiment of the inventive device disclosed herein, in operative relation to the adjacent parts of the side panel assembly of the truck or truck trailer body.
FIG. 7 is a detailed transverse vertical section corresponding to the view shown in FIG. 6, showing components of an alternative embodiment of the inventive device disclosed herein, also in operative relation to an adjacent part of the side panel assembly of the truck or truck trailer body.

The showing in FIG. 6 includes various structural features of one side panel assembly 14 constructed and arranged to cooperate with one of four pull-off door supporting arms 41. In the preferred embodiment of side panel assembly 14, its generally imperforate planar inner surface is twice interrupted by a lengthwise channel 46 recessed therein of the proper size and shape to receive therein a closely fitted elongated flexible protective sealing strip generally designated by reference numeral 47 preferably comprising a tough resilient plastic material 48 protected against excessive frictional interaction with coacting flexible side wiper strip 31 by a thin stainless steel or other flexible metal strip 49. The flexible sealing strip 47 is normally maintained within channel 46 and flush with inner surface 45 of side panel assembly 14 by a series of machine screws 58, to completely cover and protect each longitudinal slot through side panel assembly 14, defined by upper edge 43 and lower edge 44 thereof.

Referring more particularly to the showing in FIG. 6, it will be evident each lengthwise channel 46 is relatively very wide and relatively very shallow with its relatively narrow upper and lower side walls respectively adjacent to and of a width equal to the width of the upper and lower edges of flexible protective sealing strip 47, and with its relatively wide bottom, or, here as shown, its back wall comprising upper and lower portions straddling the relatively narrow longitudinal slot defined by edges 43 and 44, and cooperating to fully support the associated flexible protective sealing strip 47 against substantial outward deflection under the outward forces exerted by a load of earth material acting along the entire length of the load carrying compartment of the elongated truck body whenever the cooperating door supporting arm 41 is not present as shown in FIG. 6.

Referring again to FIG. 6, flexible sealing strip 47 is shown locally deflected angularly away from inner surface 45 of side panel assembly 14 to accommodate passage of pull-off door supporting arm 41 through the slot defined by upper edge 43 and lower edge 44 for secure attachment to the elongated slide member generally designated by reference numeral 50 arranged to be connected to and to travel with roller drive chain 61, continuously supported in a predetermined vertical position by its rolling engagement with elongated lower track 81 fixedly supported by elongated horizontal frame member 82 of side panel assembly 14, and likewise fully constrained from upward vertical displacement by upper constraining spacer assembly 69, which may conveniently consist of several links of roller chain, positioned in rolling engagement with the underside of elongated upper track 83 fixedly supported by elongated horizontal frame member 84 of side panel assembly 14.

FIG. 7 is a detailed transverse section corresponding to a portion of FIG. 6 and showing an alternative embodiment of the inventive device disclosed herein, wherein the elongated flexible sealing strip 47 consists of multiple layers of stainless steel or other flexible metal strips 59, all secured in channel 46 flush with the inner surface 45 of the side panel assembly by a series of machine screws 58.

Figure 8:
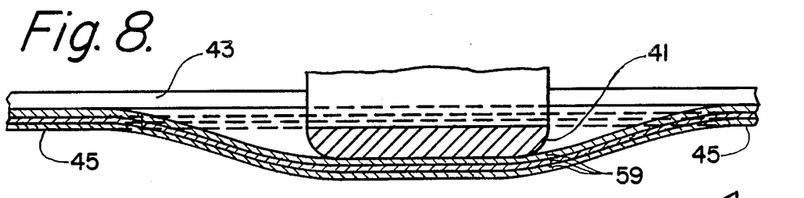
FIG. 8 is a detailed horizontal bottom sectional view, taken on line 8—8 of FIG. 6 showing the pull-off door supporting arm in operative relation to its cooperating flexible protective sealing strip and the adjoining inner surface of the side panel assembly of the truck or truck trailer body.

FIG. 8 provides a bottom view of a detailed horizontal section illustrating the manner in which the elongated flexible sealing strip 47, shown comprising multiple thin flexible metal strips 59, as shown in FIG. 7, is first temporarily displaced from its normal position with its exposed surface flush with the inner surface 45 of side panel assembly 14 and then returned to its normal position whenever pull-off door supporting arm 41 is displaced lengthwise of the slot, indicated in FIG. 8 by the showing of its upper edge 43.

Figure 9:
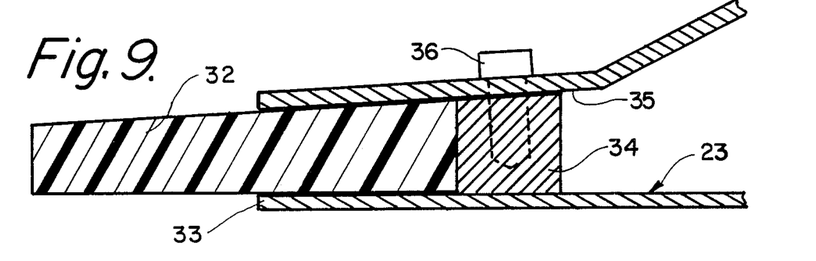
FIG. 9 is an enlarged detailed cross section of the edge of the pull-off door, taken on line 9—9 of FIG. 3, showing an advanced means of supporting and securing flexible wiper strips along the bottom and side edges of the pull-off door.

FIG. 9 is a detailed partial section, taken on line 9—9 of FIG. 3, including structural details of the wiper strip installation not included in the small scale simplified schematic representation of the wiper strip installation included in the general showing comprising FIG. 2, showing the wiper back-up flange 33, the elongated wiper stop block 34, the wiper clamping flange 35, and a typical wiper securing bolt 36, together an advanced arrangement for securing elongated flexible wiper strip 32 to the bottom edge of a load displacing door assembly such as the pull-off door assembly described herein. The wiper strips 31 are attached to the opposite side edges of the pull-off door assembly 20 by the same type of clamping arrangement as is shown in FIG. 9.

Figures 10, 11:
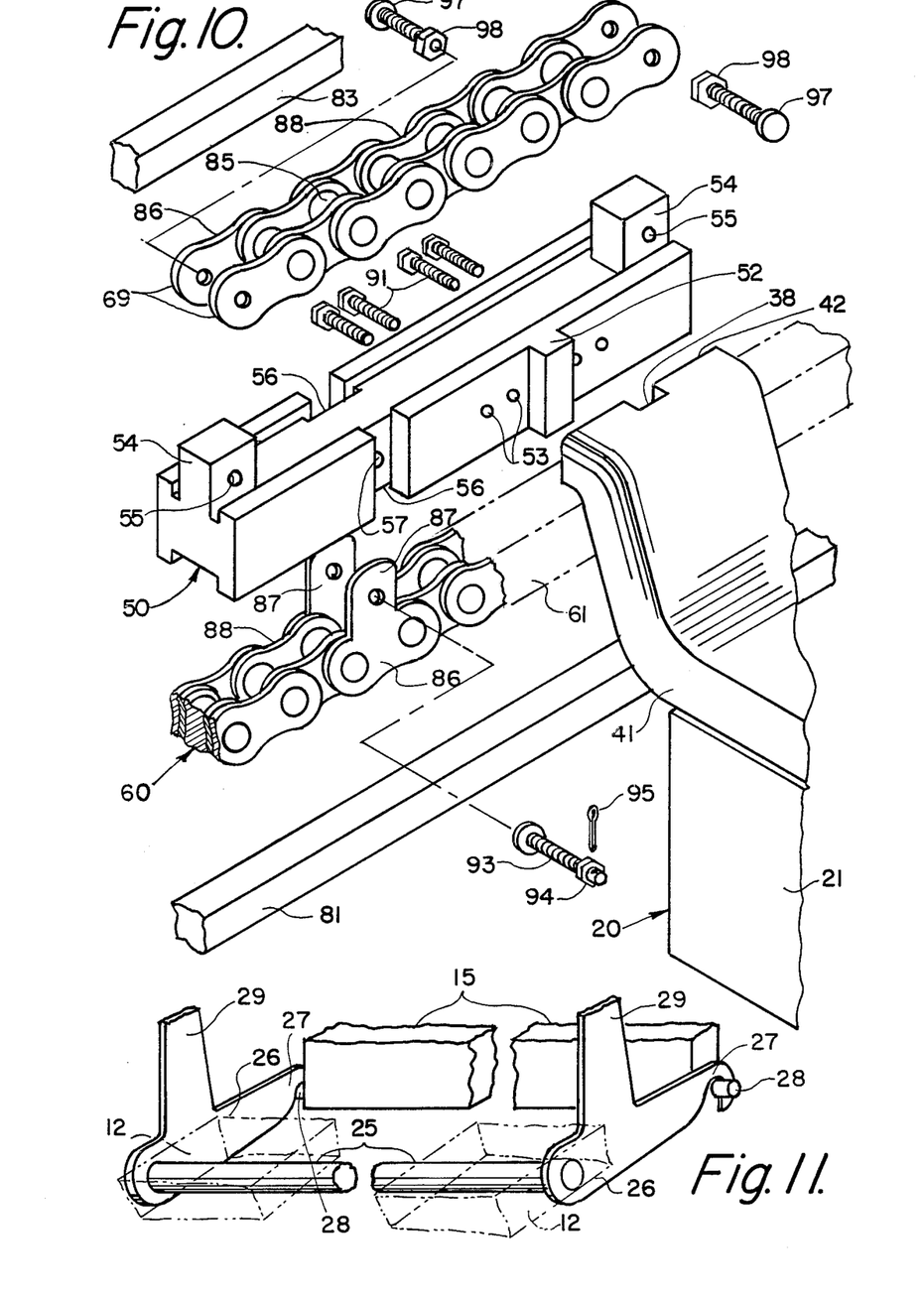
FIG. 10 is an isometric view of the several novel components of the inventive device shown in FIG. 6, exploded in order to best illustrate various structural details of these several components.
FIG. 11 is a simplified perspective view of essential details of a representative rear door locking mechanism.

Referring now to FIG. 10, this exploded isometric view conveniently shows additional details of several components of the upper chain drive mechanism 60, also illustrated in FIG. 6, including the vertical slot 38 in the outer end 42 of the door supporting arm 41 arranged to fit closely over the arm locating key 52 projecting from the side of the elongated body 51 of the door actuating slide member generally designated by reference numeral 50; the opposed vertical T-slots 56 in opposite sides of elongated body 51 arranged to receive and secure therein upstanding chain connecting ears 87 of chain outer links 86, so that the slide member 50 and the door supporting arm 41 supported thereby are always moved with roller drive chain 61; and the upstanding lugs 54 at the opposite ends of the elongated body 51 arranged to support and secure the door constraining spacer 69 positioned to be maintained in rolling contact with the elongated door constraining track 83.

Referring finally to FIG. 11, the showing therein includes the components of a simple latch mechanism for selectively locking and releasing the rear load retaining door 15, specifically pivotally mounted latch mounting shaft 25, disposed transversely of and through bottom panel assembly 12 of said body 10 at the location indicated in FIG. 2, supporting at its opposite ends elongated door latch arms 26, each provided at its outer end with a hooked portion 27 arranged to engage and secure one of the rear door locking pins 28 projecting from the opposite lower sides of rear door 15, and each including an elongated upstanding manually operable handle 29, by either of which the shaft 25 and the latch arms 26 attached thereto may be rotated counterclockwise, as seen in FIG. 11, to release locking pins 28 and thereby rear door 15.

OPERATION OF THE INVENTION

A truck or truck trailer elongated body 10 as shown in FIG. 1 with its rear load retaining door 15 in its closed position in which it is secured, as by the latch mechanism shown in FIG. 11, and with its load displacing door 20 located in its initial position at the front end of the body 10 is first loaded with a particulate semi-fluid load such as dirt, sand, gravel, asphalt or other material, transported to the desired destination for the particular load contained, and then emptied by first releasing the latch mechanism illustrated in FIG. 11 by rotating either handle 29 counterclockwise as seen therein, then energizing rotary hydraulic motor 101 of main driven mechanism 100 to produce synchronous movement of the upper chain drive mechanisms 60 via upper power drive sprockets 68, upper power drive chains 67 and upper power driven sprockets 66, and of the lower chain drive mechanisms 70 via lower power drive sprockets 78, lower power drive chains 77 and lower power driven sprockets 76, as shown best in FIG. 5, to produce the requisite lengthwise movement of the load displacing door, or pull-off door, 20 through its position as shown in FIG. 2 to the end of the body 10.

The load displacing door 20 is precisely and securely supported for its facilitated movement lengthwise of body 10 by four elongated pull-off door supporting arms 41, thin-sectioned transversely of the body 10, cranked, and each having its inner end attached to one end of a front door frame member 21, all as shown in FIGS. 6 and 10. The manner in which each door supporting arm 41 passes beneath its associated elongated flexible protective sealing strip is shown best in FIG. 6, as is the manner in which the outer end of one of the door supporting arms is connected to pull-off door actuating slide member 50 in turn connected to roller drive chain 61 of one of the upper chain drive mechanisms 60 for controlled movement of the pull-off door 20 additionally supported and constrained by elongated tracks 81 and 83, respectively, also as shown in FIGS. 6 and 10.

Since the respective component parts used to connect the lower pair of pull-off door supporting arms 41 to the respective lower chain drive mechanisms 70, shown schematically in FIG. 5 and elsewhere, are desireably substantially identical to and interchangeable with the corresponding component parts used to connect the upper pair of pull-off door supporting arms 41 to the respective upper chain drive mechanisms 60, as shown in FIGS. 6 and 10, FIGS. 6 and 10 can serve also to show details of the arrangement for connecting the pull-off door assembly 20 to each of the lower chain drive mechanisms 70, wherein each roller drive chain 71, shown schematically in FIGS. 2 and 5, includes chain outer links 86 with upstanding ears 87, as shown in FIG. 10, connected to the associated elongated body 51, as shown in FIG. 10, and wherein each door constraining spacer 79, as shown in FIG. 2, is secured to the upstanding lugs 54 at the opposite ends of the elongated body 51.

Incidentally, rather than attaching the outer end 42 of each pull-off door supporting arm 41 to the elongated body 51 by machine screws 91 passed through transverse holes 53 and into engagement with supporting arm 41, other suitable attachment means may be used, or the pull-off door supporting arm 41 and the elongated body 51 may be formed integrally as a single high-strength unit. Likewise, the bolt 93, washer 94 and cotter pin 95 shown in FIG. 9 as the means of interconnecting upstanding connecting links 87 of roller chain outer links 86 and elongated body 51 through transverse hole 57 may be replaced by other suitable attachment means, and the machine bolt 97 and nut 98 shown in FIG. 9 as the means of interconnecting the outer links 88 of the roller chain segment used as upper pull-off constraining spacer 69 and the upstanding lugs 54 through the transverse holes 55 may be replaced by other suitable attachment means.

Since each elongated flexible sealing strip 47 is normally fitted entirely within its associated elongated recessed channel 46 with its exposed surface flush with the smooth inner surface 45 of each side panel 14 along the entire length of the load containing compartment within the body 10 as defined by the inside surfaces of the bottom panel assembly 12 and the side panel assembly 14, the inside surface of rear door 15, and the rearwardly facing working surface of pull-off door 20, the elongated flexible side wiper strips 31 along the side edges of door 20, shown in FIG. 3 and in greatest detail in FIG. 9, are moved the entire length of body 10 in fully sealable engagement with the effectively uninterrupted inner surfaces of the side panel assemblies 14.

This is so, because the local angular deflection of each elongated flexible sealing strip 47, as shown in FIG. 6 or 7, and additionally in FIG. 8, occurs only as a door supporting arm 41 passes beneath strip 47, and the door supporting arms 41 are all located forwardly of the rearwardly facing working surface of door 20, and hence outside of the load containing compartment defined as described above.

Additionally, the operation of the inventive device as described above may be readily adapted to the off-loading of other types of materials such as baled hay, pelletized goods, containerized shipments, or the like.

Alternatively, for operation of the inventive device as a compactor for relatively light, bulky material, such as paper trash or the like, the rear door 15 need only be maintained locked in place in the position shown in FIG. 2, by latch means such as shown in FIG. 11, whereupon the rearward movement of the load displacing donor 20 rearwardly of the body 10 will serve nicely to compact the load. In fact, in this configuration, a truck trailer fitted with a body 10 equipped as described hereinabove and connected to a suitable auxiliary source of power will serve well as a stand-by compactor unit absent an associated truck tractor unit, as at a loading dock or elsewhere.

What is claimed is:

1. In an elongated load carrying body arranged to be mounted fixedly on a track or truck trailer including an elongated bottom panel and elongated opposite side panels, all three with smoothly contoured inner surface, a rearwardly located load constraining door selectively closed and latched to contain a load within the elongated body or unlatched and open to release a load from the elongated body, an initially forwardly located load moving door having bottom and side edge sealing portions maintained in sealed sliding engagement with the inner surfaces of the bottom panel and the opposite side panels, respectively, the load moving door being supported upon opposed door supporting arms respectively passing through cooperating elongated slots extending lengthwise of and through the opposite side panels for engagement with and synchronous movement by load moving door driving means respectively mounted upon the opposite side panels outwardly beyond each of said slots and operative to move the load moving door lengthwise of the elongated body toward and away from the load constraining door to form a load carrying compartment of a length variable with movement of the load moving door, the improvement comprising:

relatively shallow and relatively wide elongated channels disposed lengthwise of and recessed in and outwardly from the otherwise smoothly contoured inner surfaces of the opposite side panels and each having a back wall including upper and lower portions thereof together straddling one of the relatively narrower lengthwise elongated slots, elongated flexible sealing strips disposed entirely within and closely interfitted within and filling each said elongated channel, the exposed inner surface of each said flexible sealing strip being smoothly contoured and coacting with the otherwise smoothly contoured inner surface of the adjoining and coacting side panel to form an uninterrupted smoothly contoured and fully sealed inner surface throughout the load carrying compartment of the elongated body in uninterrupted sealed engagement with the edge sealing portions of the load moving door, wherein the upper and lower portions of the back wall of each said relatively wide elongated channel, respectively adjacent the upper and lower edges of each relatively narrow elongated slot and each fixedly supported by the coacting elongated side panel, respectively fixedly support the upper and lower edges of its associated elongated flexible sealing strip, and thereby support the entire elongated flexible sealing strip, against any substantial outward deflection thereof by the accumulated weight of material confined within the load carrying compartment of the elongated body, thereby maintaining each said relatively narrow elongated slot fully sealed lengthwise of the entire load carrying compartment, fastening means securing the upper edge of each said flexible sealing strip to the upper portion of the back wall of each said channel, to maintain each said flexible sealing strip in operative relation to its coacting side panel and to allow inward deflection of the lower edge of each said flexible sealing strip outside of the load carrying compartment of the elongated body to permit the passage therebehind of one of the supporting arms for the load moving door, and a plurality of elongated constraining means for the load moving door, each mounted fixedly upon the elongated load carrying body adjacent to and outwardly beyond each fully sealed elongated slot, and each including an opposed pair of elongated straight rigid track members together supporting and closely confining a slide assembly fixedly attached to the outer end of each door supporting arm for movement of the respective slide assemblies freely lengthwise of the elongated load carrying body only, responsive to the operation of the door driving means, and not otherwise either vertically or horizontally.

* * * * *